United States Patent
Shah et al.

(10) Patent No.: US 12,088,613 B2
(45) Date of Patent: *Sep. 10, 2024

(54) MACHINE LEARNING POWERED AUTHENTICATION CHALLENGES

(71) Applicant: Snap Inc., Santa Monica, CA (US)

(72) Inventors: Neil Shah, Los Angeles, CA (US); Mingyi Zhao, Los Angeles, CA (US); Yu-Hsin Chen, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,807

(22) Filed: Apr. 20, 2023

(65) Prior Publication Data
US 2023/0262082 A1   Aug. 17, 2023

Related U.S. Application Data

(63) Continuation of application No. 16/450,463, filed on Jun. 24, 2019, now Pat. No. 11,641,368.

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/083* (2013.01); *H04L 63/1433* (2013.01)

(58) Field of Classification Search
CPC ............... H04L 63/1425; H04L 63/083; H04L 63/1433; H04L 63/08; G06N 20/00
See application file for complete search history.

(56) References Cited

U.S. PATENT DOCUMENTS

| | | | |
|---|---|---|---|
| 10,051,001 B1 | 8/2018 | Ashley et al. | |
| 10,841,338 B1 | 11/2020 | Lin et al. | |
| 11,641,368 B1 * | 5/2023 | Shah | H04L 63/1433 |
| | | | 726/6 |
| 2015/0339477 A1 | 11/2015 | Abrams et al. | |
| 2016/0105801 A1 | 4/2016 | Wittenberg et al. | |
| 2016/0366126 A1 | 12/2016 | Sharifi et al. | |
| 2016/0371618 A1 | 12/2016 | Leidner et al. | |
| 2018/0027006 A1 | 1/2018 | Zimmermann et al. | |

(Continued)

OTHER PUBLICATIONS

"U.S. Appl. No. 16/450,463, 312 Amendment filed Mar. 14, 2023", 7 pgs.

(Continued)

*Primary Examiner* — Joseph P Hirl
*Assistant Examiner* — Thomas A Gyorfi
(74) *Attorney, Agent, or Firm* — Schwegman Lundberg & Woessner, P.A.

(57) ABSTRACT

Systems and methods are disclosed for automatically predicting a risk score of a user login attempt by receiving a user login attempt and generating a login feature vector associated with the user login attempt. The systems and methods further train a machine learning technique to establish a relationship between the login feature vector and the risk score. The trained machine learning technique is applied to new user login attempts to predict a risk score associated with the login attempt and issue an authentication challenge to the user if the risk score exceeds a predetermined threshold value.

20 Claims, 7 Drawing Sheets

(56) References Cited

U.S. PATENT DOCUMENTS

2020/0184048 A1 6/2020 Toth et al.
2020/0380119 A1 12/2020 Correa Bahnsen et al.

OTHER PUBLICATIONS

"U.S. Appl. No. 16/450,463, Final Office Action mailed Feb. 8, 2022", 11 pgs.
"U.S. Appl. No. 16/450,463, Non Final Office Action mailed May 26, 2022", 12 pgs.
"U.S. Appl. No. 16/450,463, Non Final Office Action mailed Jun. 30, 2021", 10 pgs.
"U.S. Appl. No. 16/450,463, Notice of Allowance mailed Dec. 14, 2022", 8 pgs.
"U.S. Appl. No. 16/450,463, PTO Response to Rule 312 Communication mailed Apr. 3, 2023", 2 pgs.
"U.S. Appl. No. 16/450,463, Response filed May 9, 2022 to Final Office Action mailed Feb. 8, 2022", 9 pgs.
"U.S. Appl. No. 16/450,463, Response filed Sep. 26, 2022 to Non Final Office Action mailed May 26, 2022", 9 pgs.
"U.S. Appl. No. 16/450,463, Response filed Sep. 30, 2021 to Non Final Office Action mailed Jun. 30, 2021", 10 pgs.

* cited by examiner

MACHINE LEARNING POWERED AUTHENTICATION CHALLENGES

PRIORITY APPLICATION

This application is a continuation of U.S. patent application Ser. No. 16/450,463, filed on Jun. 24, 2019, the disclosure of which is incorporated by reference herein in its entirety.

TECHNICAL FIELD

Embodiments of the present disclosure relate generally to online user account security and privacy. More particularly, but not by way of limitation, the present disclosure addresses systems and methods for issuing authentication challenges in response to user login attempts.

BACKGROUND

Users of online applications are increasingly subject to account information hijacking by bad actors. User account information such as usernames and passwords may be compromised and misused by third party bad actors. In order to improve online account security, online applications may require users to verify their online identity through additional authentication processes each time a user attempts to login to an online application. However, these processes may unfairly target legitimate users attempting to access their own online accounts. This may lead to an impaired user experience and due to inconvenience or apathy, may result in decreased user engagement with the online application.

BRIEF DESCRIPTION OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. Some embodiments are illustrated by way of example, and not limitation, in the figure of the accompanying drawings in which:

To easily identify the discussion of any particular element or act, the most significant digit or digits in a reference number refer to the figure number in which that element is first introduced.

Figure 1:
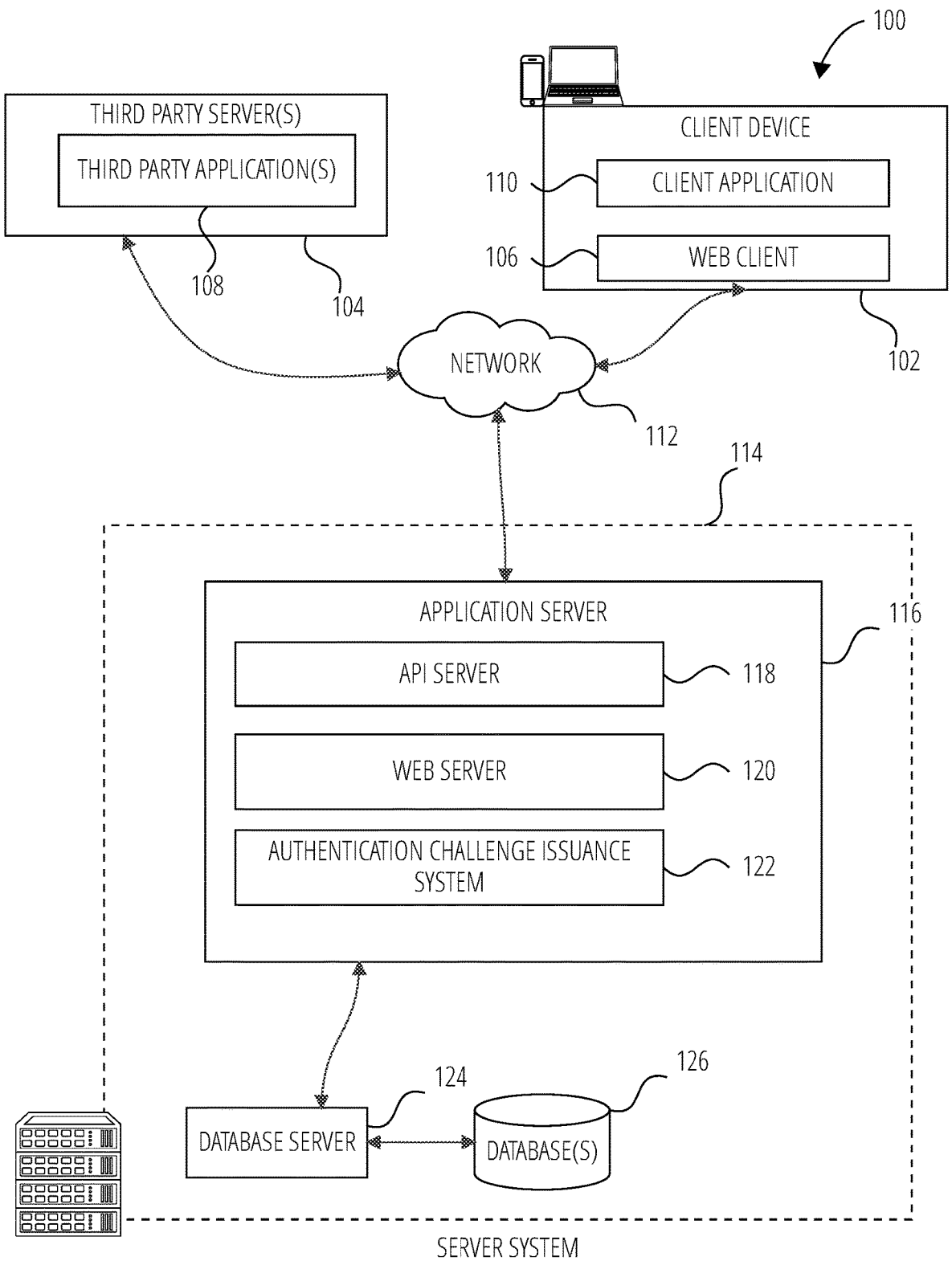

FIG. 1 is a diagrammatic representation of a networked environment in which the present disclosure may be deployed, in accordance with some example embodiments.

Figure 2:
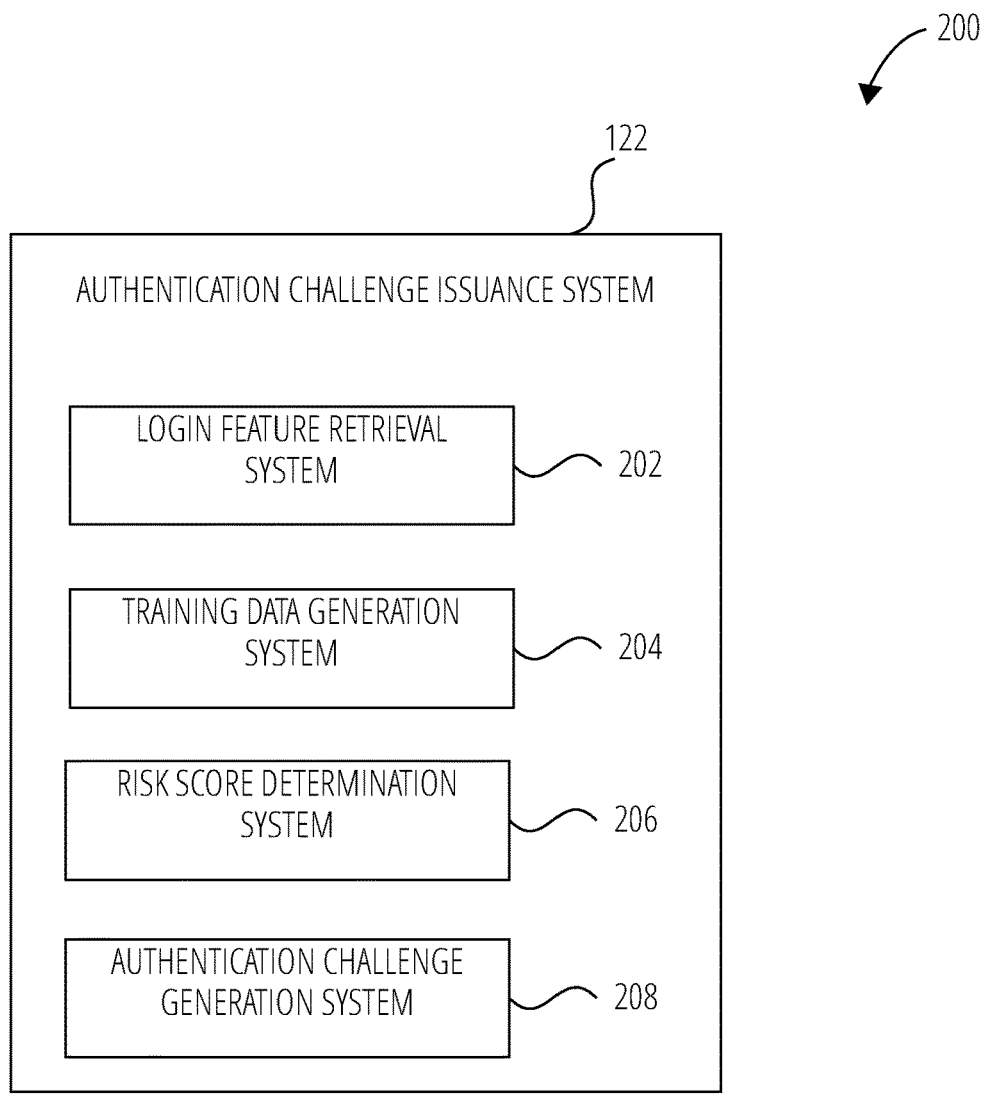

FIG. 2 is a block diagram of an authentication challenge issuance system, in accordance with some example embodiments.

Figure 3:
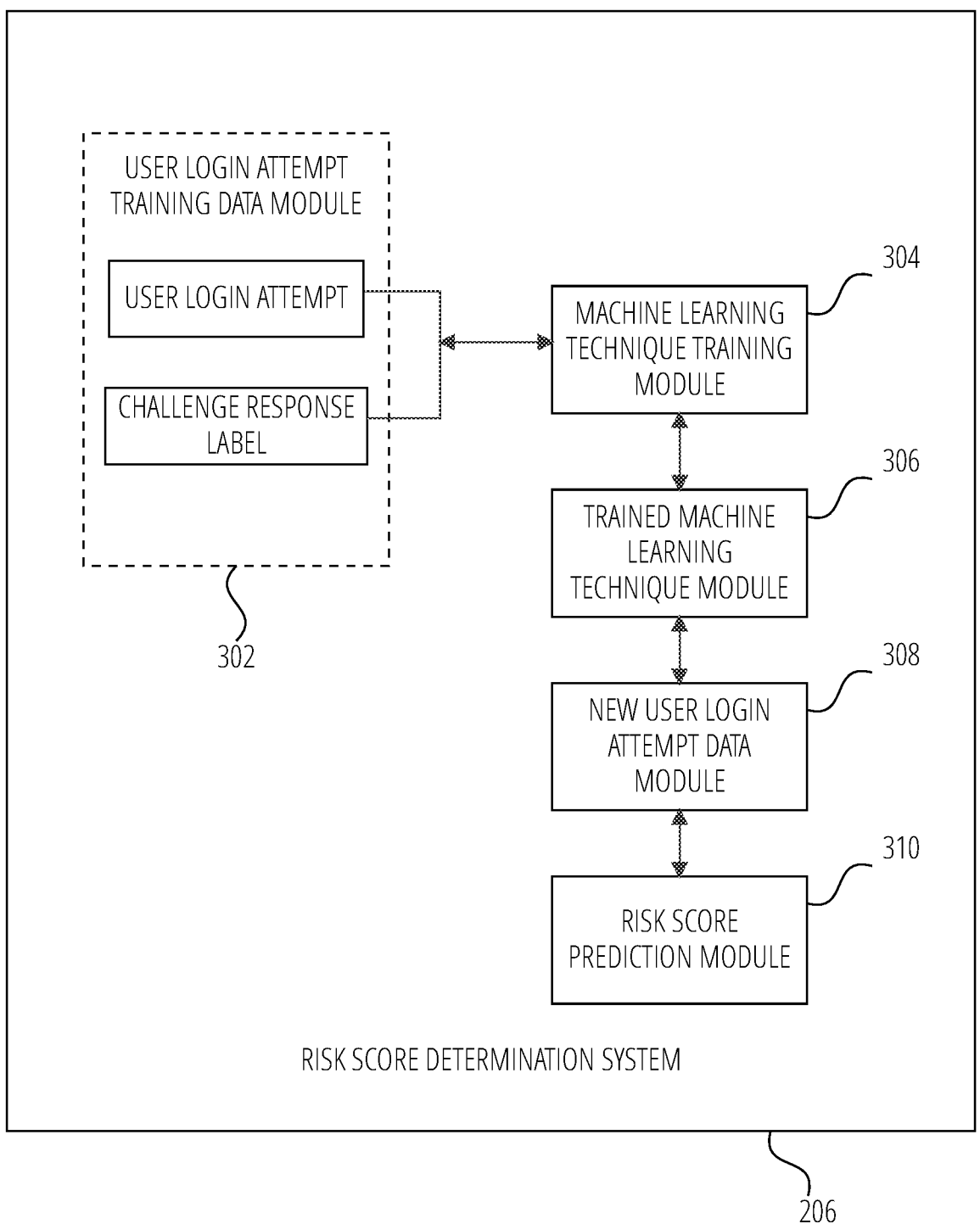

FIG. 3 is a diagrammatic representation of a risk score determination system, in accordance with some example embodiments.

Figure 4:
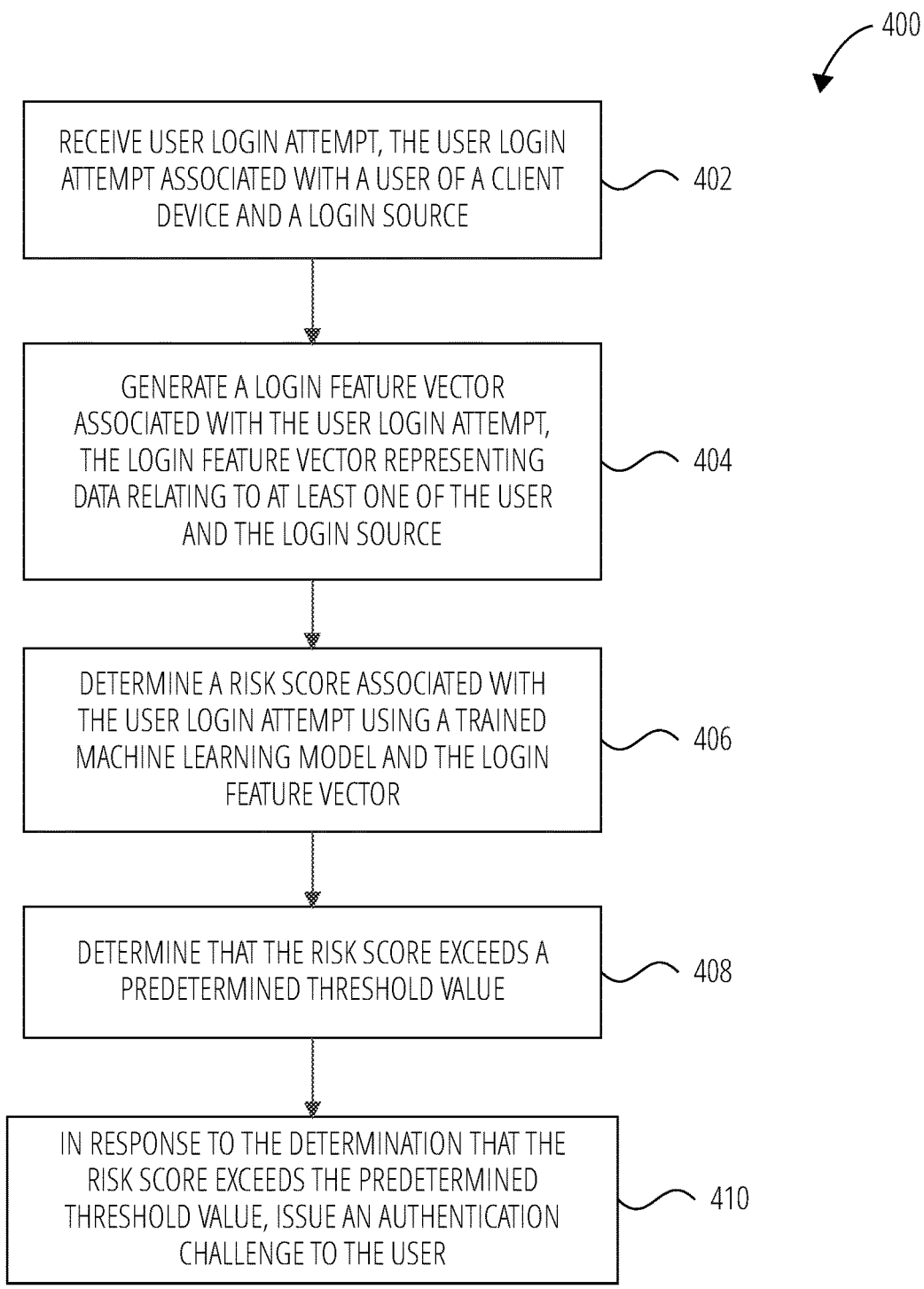

FIG. 4 illustrates a flow diagram of processes for automatically issuing an authentication challenge in accordance with some example embodiments.

Figure 5:
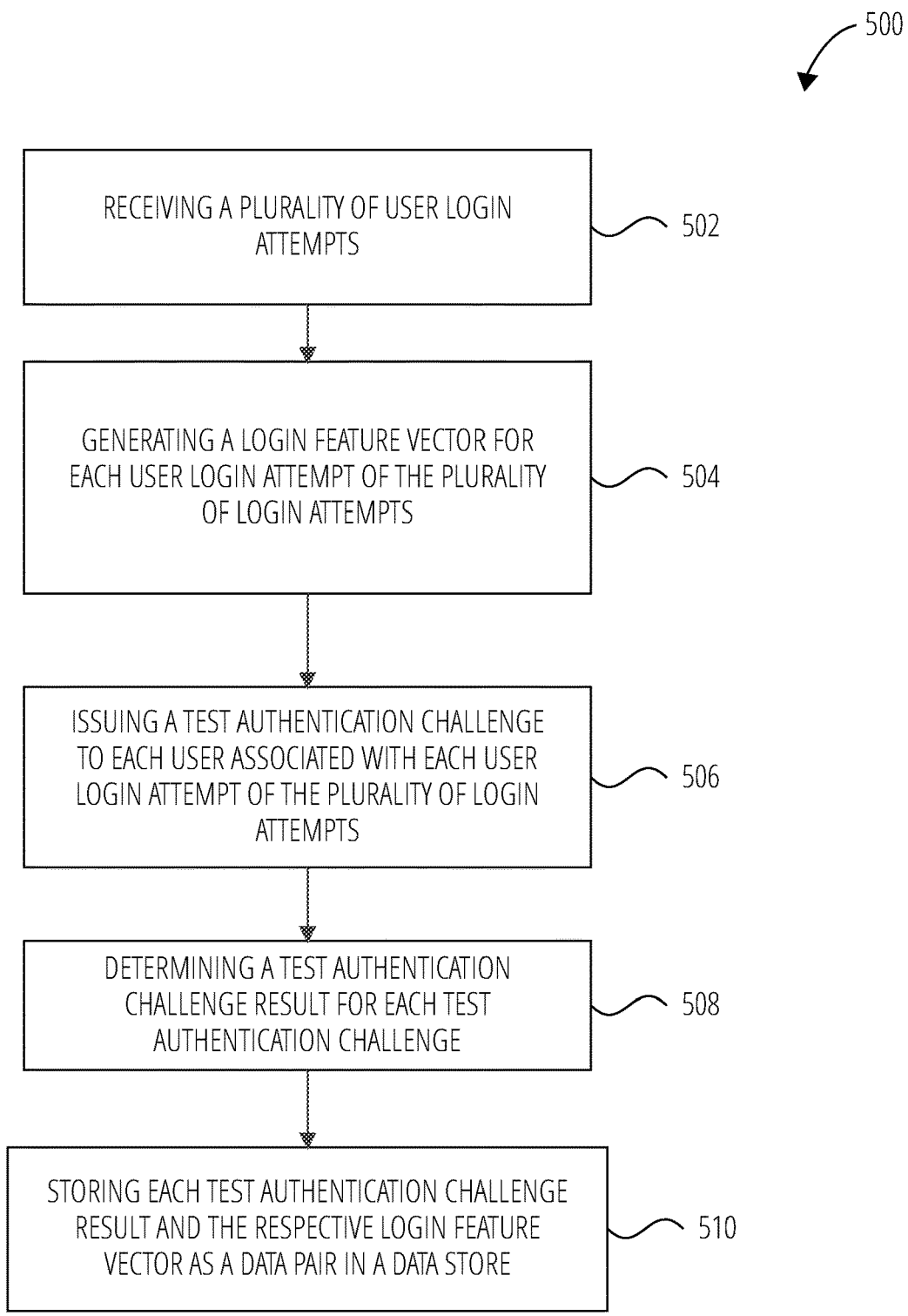

FIG. 5 illustrates a flow diagram of processes for collecting a training data set in accordance with some example embodiments.

Figure 6:
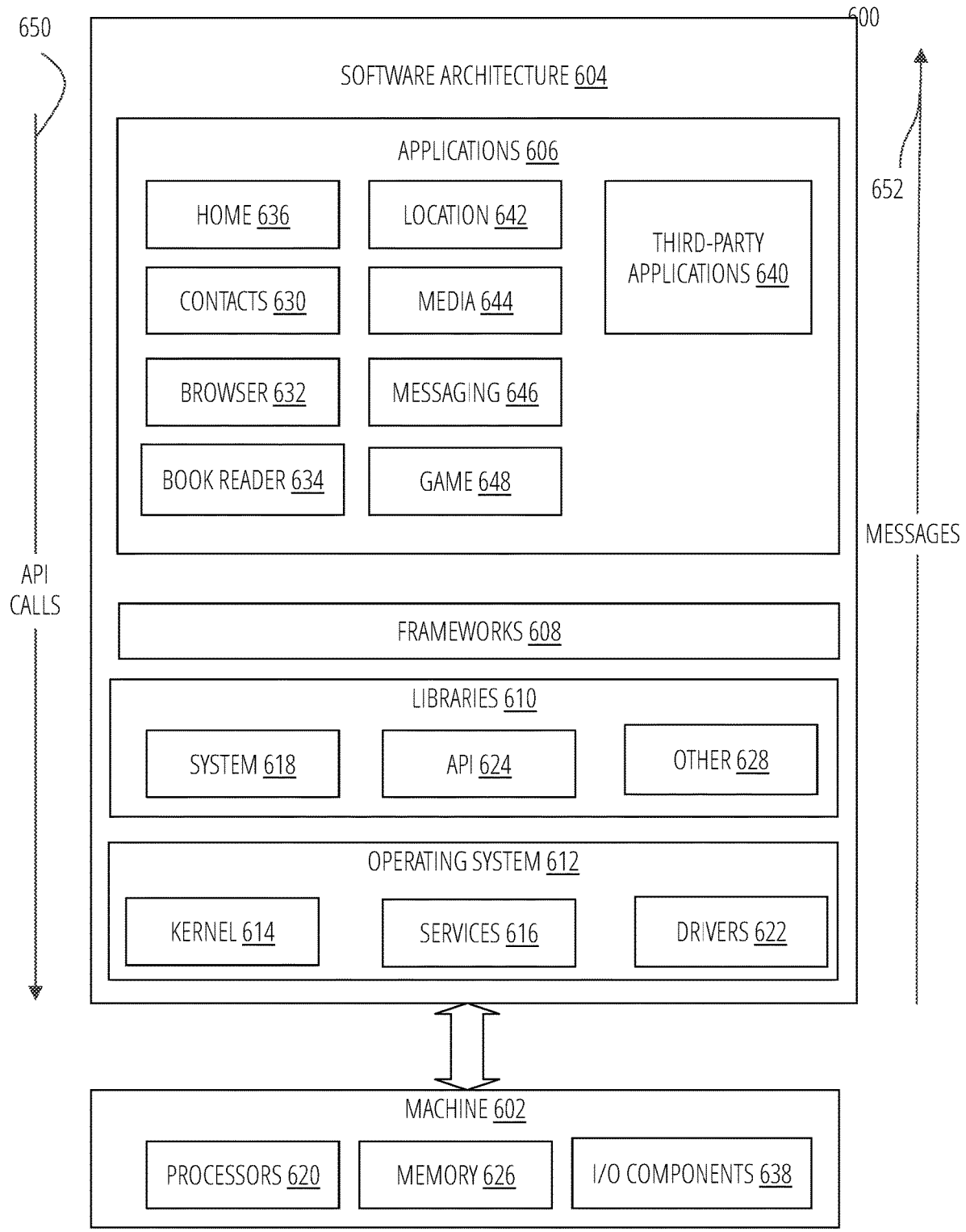

FIG. 6 is block diagram showing a software architecture within which the present disclosure may be implemented, in accordance with some example embodiments.

Figure 7:
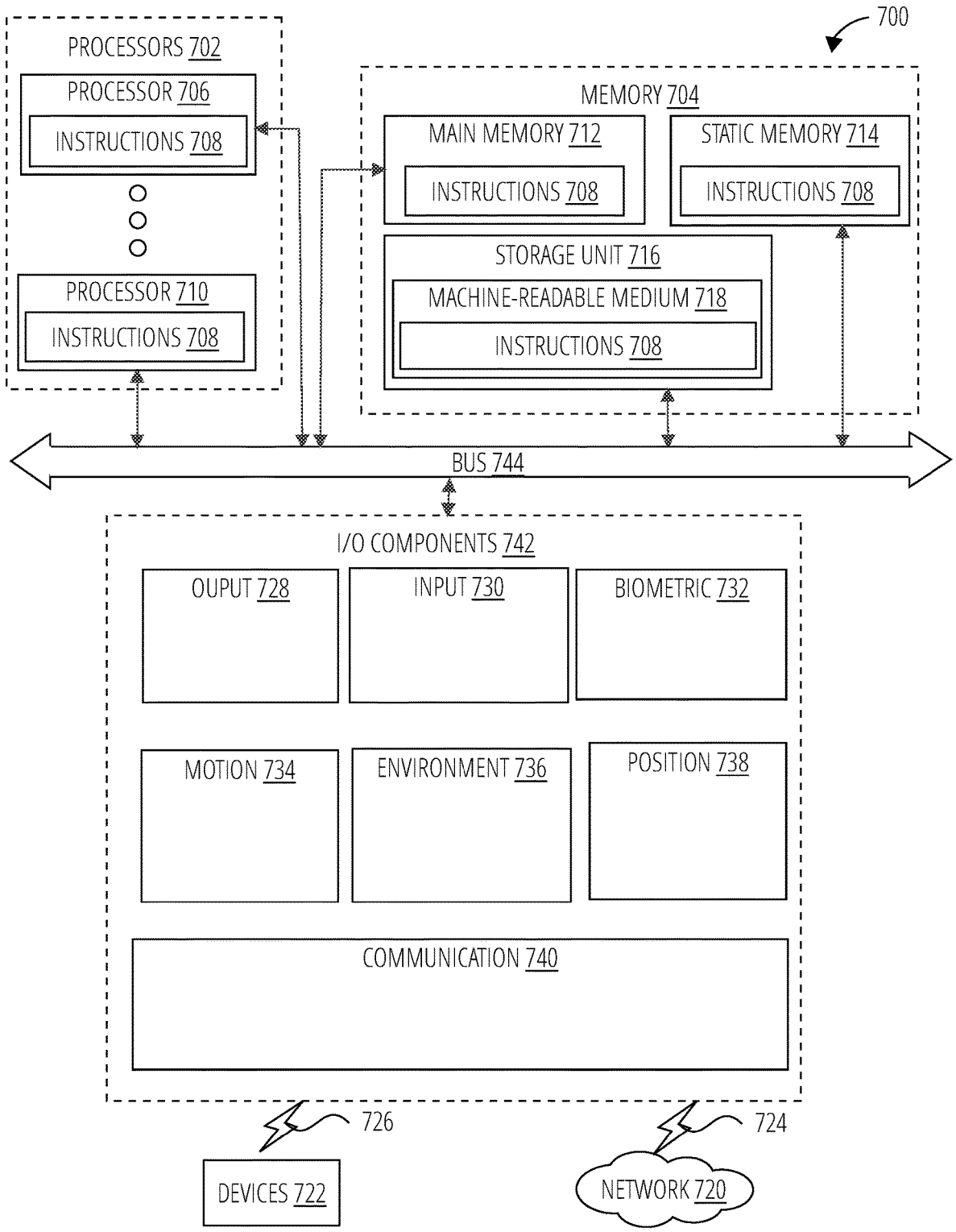

FIG. 7 is a diagrammatic representation of a machine, in the form of a computer system within which a set of instructions may be executed for causing the machine to perform any one or more of the methodologies discussed, in accordance with some example embodiments.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Issuing further authentication processes to legitimate users of an online application may discourage users from re-engaging with the online application. However, account privacy of online accounts remains to be a primary concern for many users. Therefore, a method for targeting high risk user login attempts may safeguard legitimate users from unnecessary inconveniences and deter third party bad actors from compromising account information. The following paragraphs describe a method for issuing machine learning powered authentication challenges. The system may analyze login features associated with a user login attempt and predict the likelihood that the user login attempt is an attack by a third-party bad actor.

One aspect of the present disclosure describes a system for issuing machine learning powered authentication challenges. The system receives a user login attempt at an online application. A user login attempt may comprise a username and password associated with a user of the online application. The system generates a login feature vector with the user login attempt. The login feature vector may indicate the user login attempt's propensity for attack. For example, the login feature vector may represent a likelihood that that user login attempt is a malicious attempt. The system further applies a trained machine learning model to the login feature vector to determine a risk level associated with the user login attempt. If the risk level exceeds a predetermined threshold value, the system will issue an authentication challenge to the user associated with the user login attempt.

FIG. 1 is a block diagram showing an example system 100, according to some example embodiments, configured to automatically target authentication challenges to deter abusive behavior (e.g., unauthorized user). The system 100 includes one or more client devices such as client device 102. The client device 102 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some embodiments, the client device 102 comprises a display module (not shown) to display information (e.g., in the form of user interfaces). In further embodiments, the client device 102 comprises one or more of touch screens, accelerometers, gyroscopes, cameras, microphones, global positioning system (GPS) devices, and so forth. The client device 102 may be a device of a user that is used to access and utilize an online social platform. For example, the client device 102 may be used to input information to create an account, access data associated with the account, hijack an existing account for purposes of humiliation or exploitation and so forth.

For example, client device 102 is a device of a given user who would like to access an account on an online social platform. Client device 102 accesses a website of an online social platform (e.g., hosted by server system 114). The user inputs login credentials associated with the user. Server system 114 receives the request and provides access to the online social platform.

As another example, client device 102 is a device of a given abusive user who would like to compromise an existing account for purposes of abusive behavior. Client device 102 access a website of the online social platform (e.g., hosted by server system 114). The abusive user inputs valid login credentials for an existing valid account. The server system 114 automatically identifies that the client device 102 has not previously been used to access the existing valid account, historically. The server system 114 identifies the login attempt by client device 102 as a high-risk login attempt and automatically issues a secondary authentication challenge to the client device 102. The given abusive user is unable to successfully complete the secondary authentication challenge and the server system 114 blocks the abusive user from accessing the online social platform.

One or more users may be a person, a machine, or other means of interacting with the client device 102. In example embodiments, the user may not be part of the system 100 but may interact with the system 100 via the client device 102 or other means. For instance, the user may provide input (e.g., touch screen input or alphanumeric input) to the client device 102 and the input may be communicated to other entities in the system 100 (e.g., third party server(s) 104, server system 114, etc.) via the network 112. In this instance, the other entities in the system 100, in response to receiving the input from the user, may communicate information to the client device 102 via the network 104 to be presented to the user. In this way, the user interacts with the various entities in the system 100 using the client device 102.

The system 100 further includes a network 112. One or more portions of network 112 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 102 may access the various data and applications provided by other entities in the system 100 via web client 106 (e.g., a browser) or one or more client application 110. The client device 102 may include one or more client application(s) 110 (also referred to as "apps") such as, but not limited to, a web browser, messaging application, electronic mail (email) application, an e-commerce site application, a mapping or location application, and the like.

In some embodiments, one or more client application(s) 110 are included in a given one of the client device 110, and configured to locally provide the user interface and at least some of the functionalities, with the client application(s) 110 configured to communicate with other entities in the system 100 (e.g., third party server(s) 104, server system 114, etc.), on an as-needed basis, for data processing capabilities not locally available (e.g., to access location information, to authenticate a user, etc.). Conversely, one or more client application(s) 110 may not be included in the client device 102, and then the client device 102 may use its web browser to access the one or more applications hosted on other entities in the system 100 (e.g., third party server(s) 104, server system 114, etc.).

A server system 114 provides server-side functionality via the network 112 (e.g., the Internet or wide area network (WAN)) to: one or more third party server(s) 104, and one or more client device 102. The server system 114 includes an Application Program Interface (API) Server 118, a web server 120, and an authentication challenge issuance system 122, that may be communicatively coupled with one or more database(s) 126. The one or more database(s) 126 may be storage devices that store data related to users of the server system 114, applications associated with the server system 114, cloud services, user data, and so forth. The one or more database(s) 126 may further store information related to third party server(s) 104, third party application(s) 108, client device 102, client application 110, users, and so forth. In one example, the one or more database(s) 126 may be cloud-based storage.

The server system 114 may be a cloud computing environment, according to some example embodiments. The server system 114, and any servers associated with the server system 114, may be associated with a cloud-based application, in one example embodiment.

The server system 114 includes an authentication challenge issuance system 122. The authentication challenge issuance system 122 may include one or more servers and may be associated with a cloud-based application. The authentication challenge issuance system 122 may obtain user information associated with an online social platform from database(s) 126. The authentication challenge issuance system 122 monitors login attempt data associated with the online social platform and automatically issues authentication challenges to suspected abusive behaviors. The details of the authentication challenge issuance system 122 are provided below in connection with FIG. 2.

The system 100 further includes one or more third party server(s) 104. The one or more third party server(s) 104 may include one or more third party application(s) 108. The one or more third party application(s) 108, executing on third party server(s) 104 may interact with the server system 114 via API Server 118 via a programmatic interface provided by the API Server 118. For example, one or more the third-party application(s) 108 may request and utilize information from the server system 114 via the API Server 118 to support one or more features or functions on a website hosted by the third party or an application hosted by the third party. The third-party application(s) 108, for example, may provide software version analysis functionality that is supported by relevant functionality and data in the server system 114.

FIG. 2 is a block diagram illustrating an authentication challenge issuance system 122 according to exemplary embodiments. The authentication challenge issuance system 122 is shown as including a login feature retrieval system 202, a training data generation system 204, a risk score determination system 206, and an authentication challenge generation system 208, all configured to communicate with each other (e.g., via bus, shared memory, or a switch). Any one or more of these systems may be implemented using one or more processors (e.g., by configuring such one or more processors to perform functions described for that system and hence may include one or more processors).

Any one or more of the systems described may be implemented using hardware alone (e.g., one or more of the processors of a machine) or a combination of hardware and software. For example, any system described of the authentication challenge issuance system 122 may physically include an arrangement of one or more of the processors (e.g., a subset of or among the one or more processors of the machine) configured to perform the operations described herein for that system. As another example, any system of the authentication challenge issuance system 122 may include software, hardware, or both, that configure an arrangement of one or more processors (e.g., among the one or more processors of the machine) to perform the operations described herein for that system. Accordingly, different systems of the authentication challenge issuance system 122 may include and configure different arrangements of such processors or a single arrangement of such processors at different points in time. Moreover, any two or more systems of the authentication challenge issuance system 122 may be combined into a single system, and the functions described herein for a single system may be subdivided among multiple systems. Furthermore, according to various example embodiments, systems described herein as being implemented within a single machine, database, or device may be distributed across multiple machines, databases, or devices.

In one example embodiment the login feature retrieval system 202 identifies a set of factors which could influence a particular user login attempt's propensity for hijack. The login feature retrieval system 202 may identify the set of factors by computing a vector of login features. For example, the login feature vector may represent a likelihood that that user login attempt is a malicious attempt.

The login feature vector may comprise user-context specific features. The user-context specific features may represent how prone or likely a user is to being attacked, historically. For example, a user-context specific feature may consider the probability of a specific user successfully logging in from a given IP context (e.g., IP address). In other words, given a successful user, a user context specific feature may represent the likelihood for a particular IP context to appear. A user-context specific feature may additionally represent the probability of a user successfully logging in from a given user agent. Other user-context specific features may represent past riskiness of long attempts for a given user account, the number of distinct IP addresses associated with a user account, the number of distinct user agents associated with a user account, and so forth.

The login feature vector may further comprise login-context specific features. The login-context specific features may represent how prone a login-context (e.g., login source associated with the user login attempt) is prone to negative behaviors, historically. For example, a login-context specific feature may represent a likelihood that a given IP address will appear given a successful login attempt. Other login-context specific features may represent prevalence of a particular user agent, probability of a user login attempt from a specific IP address or a specific user agent to fail, probability of a user login attempt from a specific IP address or a specific user agent given a user was previously logged in, past riskiness of login attempts from a specific IP address, past riskiness of login attempts from a specific user agent, and so forth.

The login feature vector may additionally comprise binary signals or predefined rules that indicate a login attempt is prone to attack. The binary signals may represent user-context specific features and login-context specific features. For example, the binary signal may represent whether the user login attempt is originating from a country that the user has not visited recently, whether the user device has been specifically blacklisted by an online social network platform, if the user login credentials are associate with known third party bad actors, and so forth. The login feature vectors retrieved by the login feature retrieval system 202 may be stored in one or more database(s) 126.

The training data generation system 204 comprises a rule-based model which analyzes each login feature vector retrieved by the login feature retrieval system 202 and calculates a total risk score based on the risk values associated with each feature in the login feature vector. The training data generation system 204 further associates each login feature vector with an associated challenge response label. For example, the training data generation system 204 may comprise a set of rules which assign each feature in a login feature vector with a predefined risk score. The training data generation system 204 applies the set of rules to each login feature retrieval system 202 and calculates a total risk score of the login feature vector. A login feature vector with a high-risk score may represent a high-risk user login attempt (e.g., malicious user login attempt). A login feature vector with a low risk score may represent a low risk user login attempt (e.g., legitimate user login attempt).

The training data generation system 204 further issues an additional authentication challenge to a random sample of user login attempts to the online social platform. If the user successfully completes the additional authentication challenge, then the login feature vector associated with the user's login attempt is paired with an associated negative challenge response label. If the user fails to successfully complete the additional authentication challenge, then the login feature vector is paired with an associated positive challenge response label. In some examples, a failed authentication challenge (e.g., positive challenge response label) is represented by a "1" and a successful authentication challenge (e.g., negative challenge response label) is represented by a "0." The login feature vector and its associated challenge response label is stored in one or more databases associated with the training data generation system 204. In one example, the user login attempt training data module 302 comprises a first data portion of high-risk user login attempts and a second data portion of low-risk user login attempts. In some examples the size of the first data portion is equal to the size of the second data portion.

The risk score determination system 206 predicts whether a user login attempt is a hijack attempt (e.g., a malicious user login attempt). The authentication challenge generation system 208 generates an additional challenge to a suspected user based on the determination provided by the risk score determination system 206. Further details of the risk score determination system 206 are described below in connection with FIG. 3.

FIG. 3 illustrates a risk score determination system 206, according to some example embodiments. The risk score determination system 206 includes a new user login attempt training data module 302, a machine learning technique training module 304, a trained machine learning technique module 306, a new user login attempt data module 308, and a risk score prediction module 310.

In some implementations, some modules of risk score determination system 206 may be implemented on server system 114 and others may be implemented on third party server(s) 104. In some implementations, all of the modules of risk score determination system 206 are implemented on server system 114 or on third party server(s) 104. In such cases, server system 114 communicates information to third party server(s) 104 based on the modules implemented and vice versa.

The user login attempt training data module 302 includes a set of previous user login attempts paired with an associated challenge response label. The pairs of previous user login attempts and challenge response labels are obtained by the user login attempt training data module 302 from the training data generation system 204.

The machine learning technique training module 304 is trained to predict whether a given login feature vector is associated with a hijacking attempt by a malicious user by determining a risk score by establishing a relationship between the previous user login attempts provided by user login attempt training data module 302 and the corresponding challenge response label provided by user login attempt training data module 302.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., user login attempt features and known challenge response labels) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for predicting a risk score a given user login attempt.

The machine-learning algorithms utilize features (e.g., user login attempt data for various user login attempts to an online social platform) for analyzing the data to generate assessments (e.g., a risk score relationship to the user login attempt data). A feature is an individual measurable property of a phenomenon being observed. The concept of a feature is related to that of an explanatory variable used in statistical techniques such as linear regression. Choosing informative, discriminating, and independent features is important for effective operation of the machine-learning algorithm in pattern recognition, classification, and regression. Features may be of different types, such as numeric features, strings, and graphs. Example features are described above in connection with FIG. 2.

The machine-learning algorithms utilize the training data to find correlations among the identified features that affect the outcome or assessment (e.g., the risk score associated with the user login attempt corresponding to the features). In some example embodiments, the training data includes labeled data, which is known data for one or more identified features and one or more outcomes, such as the days to pending amount.

Once the training data are collected and processed, the machine learning technique training module 304 can be built using machine learning techniques. Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some embodiments, the machine learning technique training module 304 is trained to establish a relationship to predict a hijacking attempt by a malicious user for a given user login attempt based on one or more features (e.g., training data received from the user login attempt training data module 302). In some embodiments the risk score determination system 206 may train the machine learning technique training module 304 on a periodic basis (e.g., weekly, monthly, annually).

After being trained, the machine learning technique training module 304 is provided to the trained machine learning technique module 306. The trained machine learning technique module 306 is configured to receive new user login attempt data from new user login attempt data module 308. For example, the new user login attempt data module 308 receives a user input that is associated with a user login attempt to a social network platform. The new user login attempt data module 308 accesses database(s) 126 to obtain data associated with the user login attempt. For example, the new user login attempt data module 308 obtains the login feature vector associated with the user login attempt. The new user login attempt data module 308 instructs the trained machine learning technique module 306 to apply the trained machine learning technique to the login feature vector provided by the new user login attempt data module 308. The trained machine learning technique module 306 provides a predicted risk score based on the login feature vector provided by the new user login attempt data module 308.

In some examples, the trained machine learning technique module 306 provides the predicted risk score to the risk score prediction module 310. The risk score prediction module 310 may determine whether the risk score exceeds a predefined threshold. The predefined threshold may represent the maximum risk score of a user login attempt the authentication challenge issuance system 122 will tolerate. For example, if a user login attempt has a predicted risk score of "5" and the predefined threshold is set at a value of "4" then the risk score prediction module 310 will determine that the user login attempt is a high-risk user login attempt. In some examples, the risk scores are constrained between 0 and 1. In response to determining that the user login attempt is a high-risk user login attempt, the risk score prediction module 310, the authentication challenge generation system 208 generates an additional authentication challenge and transmits the additional authentication challenge to the user.

FIGS. 4-5 illustrates a flow diagram of processes 400-500 for automatically issuing an authentication challenge for high risk user login attempts, according to some example embodiments. The processes 400-500 may be embodied in computer-readable instructions for execution by one or more processors such that the operations of the processes 400-500 may be performed in part or in whole by the functional components of the server system 114; accordingly, the processes 400-500 are described below by way of example with reference thereto. However, in other embodiments at least some of the operations of the processes 400-500 may be deployed on various other hardware configurations. The processes 400-500 are therefore not intended to be limited to the server system 114 and can be implemented in whole, or in part, by any other component.

At operation 402, a computing system (e.g., server system 114) receives a user login attempt, the user login attempt associated with a user and a login source. A login source, for example, may represent an IP address or a user agent. A user login attempt, for example, may comprise a user input that includes a username and a password.

At operation 404, the computing system generates a login feature vector associated with the user login attempt. The login feature vector represents data relating to at least one of the user and the login source. For example, the data relating to the user may represent a likelihood that the user is prone to attack. In another example, the data relating to the login source may represent a likelihood that the login source is prone to attack. In some examples, the login feature vector may be generated by the login feature retrieval system 202.

At operation 406, the computing system determines a risk score associated with the new user login attempt using the trained machine learning technique. For example, when a user attempts to login to an online social platform, the new user login attempt data module 308 computes or determines a login feature vector associated with the new user login attempt. The new user login attempt data module 308 can compute or determine the login vector continuously or periodically. The computing system further predicts the risk score associated with the user login attempt based on the login feature vector associated with the user login attempt.

At operation 408, the computing system determines that the risk score exceeds a predetermined threshold value. In some examples, the predetermined threshold value may represent a probability that the login attempt is a malicious login attempt. In some examples, operations 406 and 408 may be implemented by the risk determination system 206.

At operation 410, based on the determination that the risk score exceeds the predetermined threshold value, the computing system issues an authentication challenge to the user. For example, an authentication challenge may require the user to verify their user login attempt with an email account associated with their user login credentials. The user may be required to access the email account and verify the user login attempt via the email account. In another example, the user may be required to verify the user login attempt from a mobile device associated with the user login credentials. For example, the authentication challenge generation system 208 may transmit a text message including an authentication code. The user may be required to enter the authentication code received at the mobile device to the online social platform in order to gain access to their user account. Although the examples above describe two types of authentication challenges generated by the authentication challenge generation system 208, the authentication challenge generation system 208 may generate any other type of authentication challenge.

In some examples, issuing the authentication challenge includes causing the authentication challenge to be displayed on a display of the client device.

In some example embodiments, the computing system determines that the user has satisfied the authentication challenge. The computing system further receives an indication that the user has satisfied the authentication challenge. In response to the indication, the computing system grants the user access to an online social platform.

In some examples, the computing system determines that the risk score does not exceed a predetermined threshold value. In response to a determination that the risk score does not exceed a predetermined threshold value, the computing system grants the user access to the online social platform without issuing an authentication challenge.

In FIG. 5, process 500 illustrates an exemplary set of operations for collecting a training dataset used for training a machine learning model to predict the risk score associated with a user login attempt.

Process 500 may be implemented, for example, by the training data generation system 204. In operation 502, the computing system, randomly samples a plurality of user login attempts. At operation 504, the computing system generates a login feature vector for each randomly sampled user login attempt.

At operation 506, the computing system issues a test authentication challenge to each user associated with each user login attempt. The authentication challenge may comprise an email confirmation, text message confirmation, or any other type of authentication challenge. In some examples, the computing system may cause the test authentication challenge to be displayed on the client device of the user. At operation 508, the computing system determines a test authentication challenge result (e.g., challenge response label) for each test authentication challenge. In some examples, the computing system determines a test authentication challenge result by receiving an input in response to the test authentication challenge. The input may be user input received from the client device.

At operation 510, the computing system stores each test authentication challenge result and the respective login feature vector as a data pair in a data store. For example, the test authentication challenge result and the respective login feature vector may be stored in one or more databases associated with the training data generation system 204. The data pairs generated by process 500 may be used to train a machine learning technique as described above in connection with FIG. 2.

In some examples, process 500 is performed periodically (e.g., weekly, monthly, annually) to update the training data set generated by the training data generation system 204. In some examples, the random sample of user login attempts includes a first portion of high-risk user login attempts and a second portion of low-risk user login attempts.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein.

The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

What is claimed is:

1. A computer-implemented method comprising:
   receiving, by one or more processors, a plurality of user login attempts, each user login attempt associated with a user of a client device and a login source;
   randomly sampling a portion of the plurality of user login attempts for each of the randomly sampled user login attempts:
   generating a login feature vector associated with the user login attempt, the login feature vector comprising a plurality of user-context features that represent a probability of malicious software attacks;
   associating the plurality of user-context features with a plurality of respective risk values;
   determining a risk score associated with the user login attempt based on the plurality of respective risk values using a trained machine learning model;
   determining that the risk score exceeds a predetermined threshold value;
   in response to the determination that the risk score exceeds the predetermined threshold value, issuing an authentication challenge to the user; and
   associating a challenge response label with the login feature vector based on a user response to the authentication challenge.

2. The computer-implemented method of claim 1, further comprising:
   determining, by the one or more processors, that the user satisfied the authentication challenge; and
   in response to the determining that the user satisfied the authentication challenge, granting the user access to an online social platform.

3. The computer-implemented method of claim 1, wherein the user-context features comprise a probability that the user can successfully login from a given Internet Protocol (IP) address.

4. The computer-implemented method of claim 1, wherein the login feature vector further comprises one or both of login-context features that represent a probability of malicious software attacks associated with the login source.

5. The computer-implemented method of claim 1, further comprising training a machine learning model, wherein training the machine learning model comprises:
   receiving a plurality of user login attempts;
   generating a login feature vector for each user login attempt of the plurality of user login attempts;
   issuing a test authentication challenge to each of the users associated with the plurality of user login attempts;
   determining a test authentication challenge result for each test authentication challenge; and
   storing each test authentication challenge result and the respective login feature vector as a data pair in a data store.

6. The computer-implemented method of claim 5, wherein a first portion of data pairs represent high-risk user login attempts and a second portion of data pairs represent low-risk user login attempts.

7. The computer-implemented method of claim 1, wherein the predetermined threshold value represents a probability that the user login attempt is a malicious login attempt.

8. The computer-implemented method of claim 1, further comprising:
   causing the authentication challenge to be displayed on the user device.

9. A system comprising:
   a memory: and
   at least one hardware processor coupled to the memory and comprising instructions that cause the system to perform operations comprising:
   receiving, by one or more processors, a plurality of user login attempts, each user login attempt associated with a user of a client device and a login source;
   randomly sampling a portion of the plurality of user login attempts
   for each of the randomly sampled user login attempts:
   generating a login feature vector associated with the user login attempt, the login feature vector comprising a plurality of user-context features that represent a probability of malicious software attacks;
   associating the plurality of user-context features with a plurality of respective risk values;
   determining a risk score associated with the user login attempt based on the plurality of respective risk values using a trained machine learning model;
   determining that the risk score exceeds a predetermined threshold value;
   in response to the determination that the risk score exceeds the predetermined threshold value, issuing an authentication challenge to the user; and
   associating a challenge response label with the login feature vector based on a user response to the authentication challenge.

10. The system of claim 9, further comprising:
    determining, by the one or more processors, that the user satisfied the authentication challenge; and in response to the determining that the user satisfied the authentication challenge, granting the user access to an online social platform.

11. The system of claim 9, wherein the user-context features comprise a probability that the user can successfully login from a given Internet Protocol (IP) address.

12. The system of claim 9, wherein the login feature vector further comprises one or both of login-context features that represent a probability of malicious software attacks associated with the login source.

13. The system of claim 9, further comprising training a machine learning model, wherein training the machine learning model comprises:
 receiving a plurality of user login attempts;
 generating a login feature vector for each user login attempt of the plurality of user login attempts;
 issuing a test authentication challenge to each of the users associated with the plurality of user login attempts;
 determining a test authentication challenge result for each test authentication challenge; and
 storing each test authentication challenge result and the respective login feature vector as a data pair in a data store.

14. The system of claim 13, wherein a first portion of data pairs represent high-risk user login attempts and a second portion of data pairs represent low-risk user login attempts.

15. The system of claim 9, wherein the predetermined threshold value represents a probability that the user login attempt is a malicious login attempt.

16. The system of claim 9, further comprising updating the determined risk score based on the login feature vector and the challenge response label associated with the login feature vector and the associated.

17. The system of claim 9, wherein associating the plurality of user-context features with the plurality of respective risk values comprises associating the plurality of user-context features with a plurality of respective predefined risk values based on a predefined set of rules.

18. A non-transitory machine-readable storage medium comprising instructions that, when executed by one or more processors of a machine cause the machine to perform operations comprising:
 receiving, by one or more processors, a plurality of user login attempts, each user login attempt associated with a user of a client device and a login source;
 randomly sampling a portion of the plurality of user login attempts
 for each of the randomly sampled user login attempts:
 generating a login feature vector associated with the user login attempt, the login feature vector comprising a plurality of user-context features that represent a probability of malicious software attacks;
 associating the plurality of user-context features with a plurality of respective risk values;
 determining a risk score associated with the user login attempt based on the plurality of respective risk values using a trained machine learning model;
 determining that the risk score exceeds a predetermined threshold value;
 in response to the determination that the risk score exceeds the predetermined threshold value, issuing an authentication challenge to the user; and
 associating a challenge response label with the login feature vector based on a user response to the authentication challenge.

19. The non-transitory machine-readable storage medium of claim 18, further comprising:
 determining, by the one or more processors, that the user satisfied the authentication challenge; and
 in response to the determining that the user satisfied the authentication challenge, granting the user access to an online social platform.

20. The non-transitory machine-readable storage medium of claim 18, wherein the user-context features comprise a probability that the user can successfully login from a given Internet Protocol (IP) address.

\* \* \* \* \*